United States Patent
Giske et al.

(10) Patent No.: US 12,422,322 B2
(45) Date of Patent: Sep. 23, 2025

(54) PRESSURE SENSOR HAVING A MEMBRANE HAVING SENSOR CHIPS HAVING MEASURING BRIDGES HAVING SENSOR ELEMENTS

(71) Applicant: PRIGNITZ MIKROSYSTEMTECHNIK GMBH, Wittenberge (DE)

(72) Inventors: Martin Giske, Eldena (DE); Steffen Sturzebecher, Eldena (DE); Dietmar Arndt, Wittenberge (DE)

(73) Assignee: PRIGNITZ MIKROSYSTEMTECHNIK GMBH, Wittenberge (DE)

( * ) Notice: Subject to any disclaimer, the term of this patent is extended or adjusted under 35 U.S.C. 154(b) by 449 days.

(21) Appl. No.: 17/784,980

(22) PCT Filed: Dec. 13, 2020

(86) PCT No.: PCT/DE2020/000344
§ 371 (c)(1),
(2) Date: Sep. 30, 2022

(87) PCT Pub. No.: WO2021/115516
PCT Pub. Date: Jun. 17, 2021

(65) Prior Publication Data
US 2023/0016275 A1 Jan. 19, 2023

(30) Foreign Application Priority Data
Dec. 14, 2019 (DE) .................. 10 2019 008 761.5

(51) Int. Cl.
*G01L 27/00* (2006.01)
*G01L 9/08* (2006.01)
*G01L 19/06* (2006.01)

(52) U.S. Cl.
CPC .......... *G01L 19/0618* (2013.01); *G01L 9/08* (2013.01)

(58) Field of Classification Search
CPC ..... G01L 19/0618; G01L 9/08; G01L 9/0055; G01L 19/06; G01L 9/04; G01L 27/00; G01L 27/002; G01L 27/005
(Continued)

(56) References Cited

U.S. PATENT DOCUMENTS 4,776,219 A * 10/1988 Friedrich ............. G01L 9/0051
73/726
5,693,887 A * 12/1997 Englund ............ G01L 19/0038
73/756
(Continued)

FOREIGN PATENT DOCUMENTS

CN 101044382 A 9/2007
CN 107449537 A 12/2017
(Continued)

OTHER PUBLICATIONS

Office Action issued in Application No. JP2022-536503 on May 22, 2023.
(Continued)

*Primary Examiner* — Robert R Raevis
(74) *Attorney, Agent, or Firm* — Fox Rothschild LLP

(57) ABSTRACT

The invention relates to pressure sensors having a membrane having sensor chips having measuring bridges having sensor elements, wherein the membrane is fastened in a housing, with a carrier or as part of a housing, to which membrane a working medium can be applied. The pressure sensors are characterised in particular in that the mechanical stresses resulting from a fastening and/or an installation of the pressure sensors do not influence the measurement result and/or the measurement signal. To this end, at least two
(Continued)

sensor chips, which are spaced apart from one another and are offset at an angle to one another, are located at least on a side of the membrane that bends on application of pressure. The measuring bridges are designed and/or connected to a controller in such a manner that at least one force resulting from the fastening of the membrane and thus acting on the membrane is or will be compensated.

8 Claims, 3 Drawing Sheets

(58) Field of Classification Search
USPC .............................. 73/1.59, 717–728; 338/42
See application file for complete search history.

(56) References Cited

U.S. PATENT DOCUMENTS

| | | | | |
|---|---|---|---|---|
| 2012/0060618 | A1* | 3/2012 | Kurtz | G01L 9/06 |
| | | | | 73/715 |
| 2015/0377729 | A1 | 12/2015 | Hio et al. | |
| 2018/0010975 | A1 | 1/2018 | Seto et al. | |

FOREIGN PATENT DOCUMENTS

| | | | | |
|---|---|---|---|---|
| CN | 107588882 | A | 1/2018 | |
| CN | 107709950 | A | 2/2018 | |
| DE | 60028678 | * | 6/2006 | |
| DE | 10114862 | B3 | 7/2006 | |
| DE | 102007033040 | A1 | 1/2008 | |
| DE | 202005021706 | U1 | 7/2009 | |
| DE | 102017214846 | A1 | 2/2019 | |
| EP | 3418707 | A1 | 12/2018 | |
| JP | 2018004591 | A | 1/2018 | |
| WO | WO-2005058133 | A2 * | 6/2005 | ........... A61B 5/0215 |

OTHER PUBLICATIONS

Office Action mailed on Nov. 28, 2023 in CN Application No. 202080086558.X.

* cited by examiner

PRESSURE SENSOR HAVING A MEMBRANE HAVING SENSOR CHIPS HAVING MEASURING BRIDGES HAVING SENSOR ELEMENTS

CROSS-REFERENCE TO RELATED APPLICATIONS

This application is a § 371 national phase entry of International Patent Application No. PCT/DE2020/000344, filed on Dec. 13, 2020, which claims priority to and the benefit of German Patent Application No. 102019008761.5 filed on Dec. 14, 2019, both of which are hereby incorporated herein by reference in their entireties.

The invention relates to pressure sensors having a membrane having sensor chips having measuring bridges having sensor elements, wherein the membrane is fastened in a housing, with a carrier or as part of a housing, to which membrane a working medium can be applied.

A cased MEMS component with disturbance compensation is known from document DE 10 2017 214 846 A1. To this end, the MEMS component is arranged in a housing and the MEMS component is in immediate mechanical contact with the housing by way of at least 50% of a MEMS component surface. Two measuring arrangements are provided for disturbance compensation, wherein one is a part of the MEMS component and the other is a part of the housing. By combining the measurement variables established therefrom, a disturbance-compensated measurement variable is obtained.

Document DE 20 2005 021 706 U1 involves a sensor element having at least one measurement element and a compensation element, which have piezoelectric and pyroelectric properties and are equipped with measurement electrodes. A correction signal used to compensate for the interference signal in the measurement signal can be derived from the compensation element.

Document EP 3 418 707 A1 discloses a mountable pressure sensor having a two-part design of the wall of a pressure channel which is connected to a measuring membrane. Due to the two-component design of the pressure channel, the material of a pressure input element can be specifically adjusted to the fluid and to chemical, thermal and mechanical loads associated with the fluid.

The pressure sensors presented in these documents use symmetrical arrangements of measuring elements which are able to withstand external parasitic error influences. However, these solutions are restricted in terms of their sensitivity with respect to the pressure that is actually to be measured. As a result, the accuracy which can be achieved is limited.

Furthermore, compact silicon chips having integrated bridge structures are known, which have a higher sensitivity. Thus, a pressure sensor device having a membrane and a sensor chip is known from document DE 101 14 862 B3. A working medium is applied to the membrane on one side. The sensor chip is arranged on the side of the membrane facing away from the working medium. Said sensor chip has a measuring bridge having four sensor elements, which form two pairs arranged in parallel, which are arranged at right angles to one another. The sensor chip is arranged on the edge of the membrane, which leads to an asymmetrical construction. A second sensor chip can be arranged for redundancy, so that reliable operation of the pressure sensor device is guaranteed. The disadvantage of this is that, as a consequence of this construction, mechanical stresses which originate, for example, from screwing in the pressure sensor device or from any other mechanical load on the sensor housing, can have repercussions on the measurement results and the output signals of the sensor.

A pressure detecting device is known from document US 2015/0 377 729 A1, which is mounted in a measurement target instrument. A deformation of a strain detecting element caused during the mounting is detected as a pressure value via multiple strain resistant bridges and is used to correct a pressure which is caused by a medium and which is to be measured.

Document DE 600 28 678 T2 involves a system for determining faults or abnormalities of a measuring sensor incorporated in a device for measuring a physical or dynamic quantity. The system is suitable for detecting a sensor failure when the resistance value in a bridge circuit has varied due to trouble or damage. To this end, a failure judgement of the bridge circuit is performed based on a voltage difference between two midpoints of the bridge circuit and a voltage difference between a voltage level of one of the two midpoints of the bridge circuit and a reference voltage level of a reference voltage source. A force resulting from the fastening of a membrane and acting on the measuring sensor is not detected.

The object, which forms the basis of the invention indicated in claim 1, is to design a pressure sensor in such a manner that the mechanical stresses resulting from a fastening and/or an installation of the pressure sensor do not influence the measurement result and/or the measurement signal.

This object is achieved with the features set out in claim 1.

The pressure sensors having a membrane having sensor chips having measuring bridges having sensor elements, wherein the membrane is fastened in a housing, with a carrier or as part of a housing, to which membrane a working medium can be applied, are characterized in particular in that the mechanical stresses resulting from a fastening and/or an installation of the pressure sensors do not influence the measurement result and/or the measurement signal.

To this end, at least two sensor chips, which are spaced apart from one another and are offset at an angle to one another, are located at least on a side of the membrane that bends on application of pressure. The measuring bridges are designed and/or connected to a controller in such a manner that at least one force resulting from the fastening of the membrane and thus acting on the membrane and the at least one mechanical stress resulting therefrom are or will be compensated.

When the pressure sensor is placed and/or fastened, mechanical stresses arise that lead to measurement errors. It has been shown that a bending stress applied to the housing causes different effects depending on the point of application of the force. The effect of arranging the sensor chips at an angle and spaced apart from one another is that the changes in the bridge voltage from the bending load in the two sensor chips are almost the same, but have opposite signs in terms of amplitude. The stress on the membrane resulting from the bending load, with the same radius and measuring bridges arranged at right angles to one another and, thus, the sensor chips, is the same amount but has the opposite sign, whereas the stresses on the measuring bridges of the sensor chips caused by the pressure to be measured have the same sign. By connecting the measuring bridges, which are arranged on the same radius of the membrane and at right angles to one another, in parallel, said measuring bridges consequently supply two stresses which are averaged by the parallel connection. The stresses of the measuring bridges resulting from the bending cancel one another out due to the opposite signs, so that they compensate one another. Thus, this arrangement is suitable for compensating at least one force acting on the membrane and the resulting mechanical stress or stresses. The stresses of the measuring bridges resulting from the pressure have the same signs in both sensor chips.

Advantageous configurations of the invention are indicated in claims 2, 3, 4 and 5-8.

The measuring bridges of the sensor chips are optionally connected in parallel to one another in such a manner that at least one force resulting from the fastening of the membrane and thus acting on the membrane and the at least one mechanical stress resulting therefrom can be compensated and thus are compensated or will be compensated.

The measuring bridges of the sensor chips are optionally offset at right angles to one another.

The sensor elements of the measuring bridges can be monolithic silicon bridge arrangements or consist of a piezoelectric element.

The sensor chips are optionally arranged off-center on the membrane.

In the case of a circular membrane, the sensor chips can be arranged on a circular ring of the same diameter.

The membrane is optionally arranged in such a manner that a working medium can be applied to said membrane on one side or both sides.

The at least two sensor chips having the measuring bridges having the sensor elements, which sensor chips are spaced apart from one another and are offset at an angle to one another, can be located on the side of the membrane, to which the working medium can be applied on one side, said side facing away from the working medium.

The sensor chips are optionally arranged on the membrane in such a manner that the same mechanical stresses emanating from the working medium are applied to the sensor chips.

The membrane is optionally arranged in a housing. The housing has a cavity covered with a region of the membrane, which cavity has an opening and/or a channel for a working medium to pass through, wherein the cavity is located on the side of the membrane opposite the side having the sensor chips.

The membrane can be a wall or a part of a wall of a housing. To this end, the housing has a cavity covered with the wall having the membrane or as a membrane. The sensor chips are located on the surface of the membrane pointing into the cavity. The membrane can thus be utilized on the front. Thus, the membrane can also be a part, for example, of a container wall.

The membrane is optionally conical or frustoconical or is located in a frustoconical ring.

An exemplary embodiment of the invention is, in each case, depicted in principle in the drawings and is described in more detail below.

Therein:

A pressure sensor substantially consists of a membrane 1 having sensor chips 2, 3 having measuring bridges having sensor elements.

Figure 1:
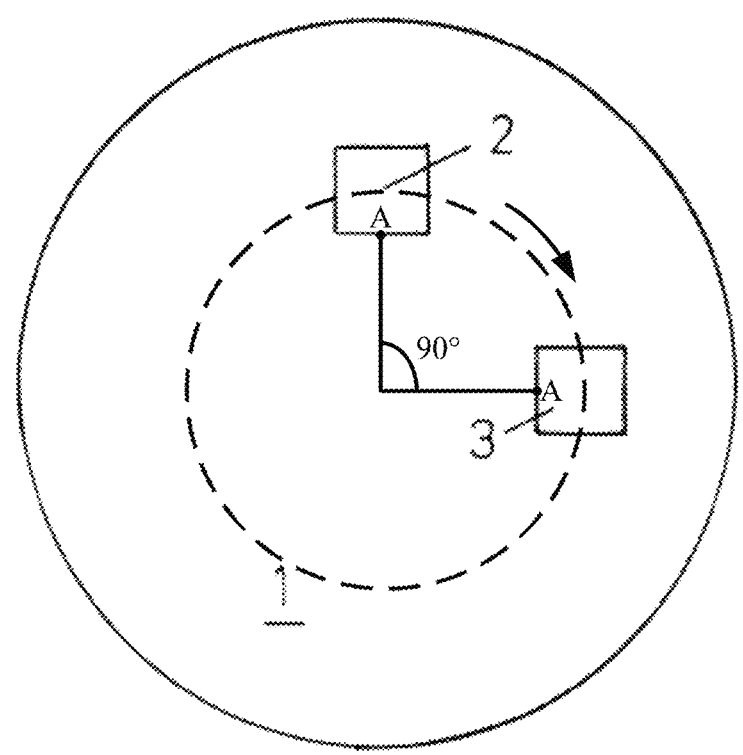
FIG. 1 shows a membrane of a pressure sensor.

FIG. 1 shows a membrane 1 of a pressure sensor in a basic representation.

Two sensor chips 2, 3, which are spaced apart from one another and are offset at an angle to one another, are arranged on the membrane 1. The measuring bridges of the sensor chips 2, 3 are designed and/or connected to a controller in such a manner that at least one force resulting from the fastening of the membrane 1 and thus acting on the membrane 1 can be compensated and thus is compensated or will be compensated. To this end, the measuring bridges can be connected in parallel to one another in such a manner that mechanical disturbances can be compensated. The measuring bridges can, furthermore, be offset at right angles to one another. The sensor elements of the measuring bridges are monolithic silicon bridge arrangements.

The forces resulting from the fastening of the membrane 1 and thus acting on the membrane 1 are in particular mechanical disturbances from mechanical stresses of approximately the same amplitude and the opposing working direction in the sensor chips 2, 3. Therefore, the stress on the membrane resulting from the bending load, with the same radius and measuring bridges arranged at right angles to one another and, thus, the sensor chips, is the same amount but has opposite signs, whereas the stresses on the measuring bridges of the sensor chips caused by the pressure to be measured are of the same sign. By connecting the measuring bridges, which are arranged on the same radius of the membrane and at right angles to one another, in parallel, said measuring bridges consequently supply two stresses which are averaged by the parallel connection. The stresses of the measuring bridges resulting from the bending cancel one another out due to the opposite signs, so that they compensate one another.

Figure 2:
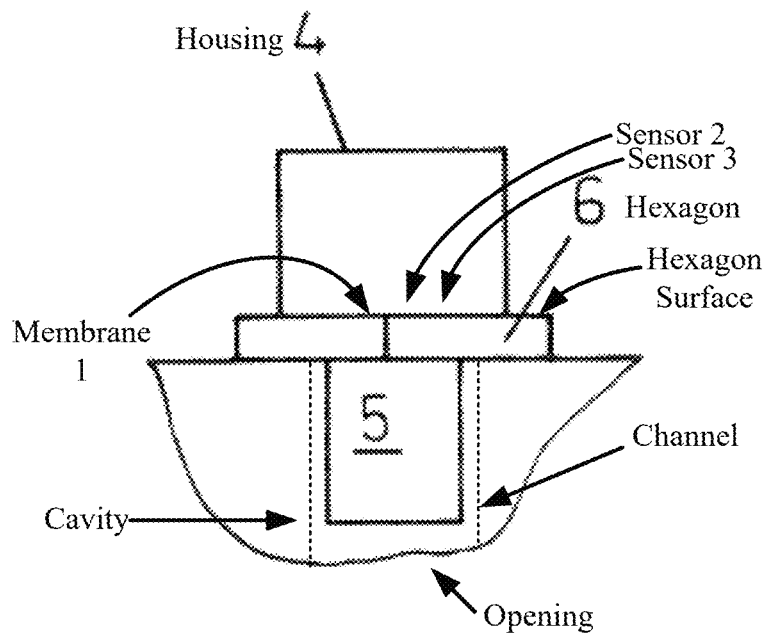
FIG. 2 shows a pressure sensor having a housing and a threaded piece as a fastening element.
Figure 3:
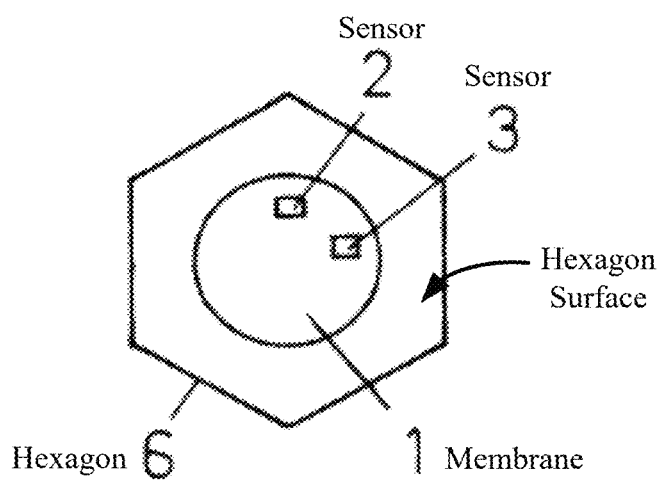
FIG. 3 shows the pressure sensor having a membrane.

FIG. 2 shows a pressure sensor having a housing 4 and a threaded piece 5 as a fastening element, and FIG. 3 shows the pressure sensor having a membrane 1, in each case, in a basic representation.

The membrane 1 is fastened in a housing 4 with a threaded piece 5 and a hexagon 6. The housing 4 has a cavity covered with a region of the membrane 1, which cavity has an opening and/or a channel for a working medium to pass through. The cavity is located on the side of the membrane 1 opposite the side having the sensor chips 2, 3.

When the housing 4 having the pressure sensor device is screwed into an engine block, for example, mechanical stresses and, thus, forces acting on the membrane 1 arise, which lead to measurement errors. As a result of the sensor chips 2, 3 being arranged at an angle and spaced apart from one another, the changes in the bridge stress from the bending load in the two sensor chips 2, 3 are virtually the same, but have opposite signs in terms of amplitude. This arrangement is thus suitable for compensating the bending stresses resulting from the fastening of the membrane 1 and, thus, the forces acting on the membrane 1. The stresses resulting from the pressure have the same signs in both sensor chips 2, 3.

Figure 4:
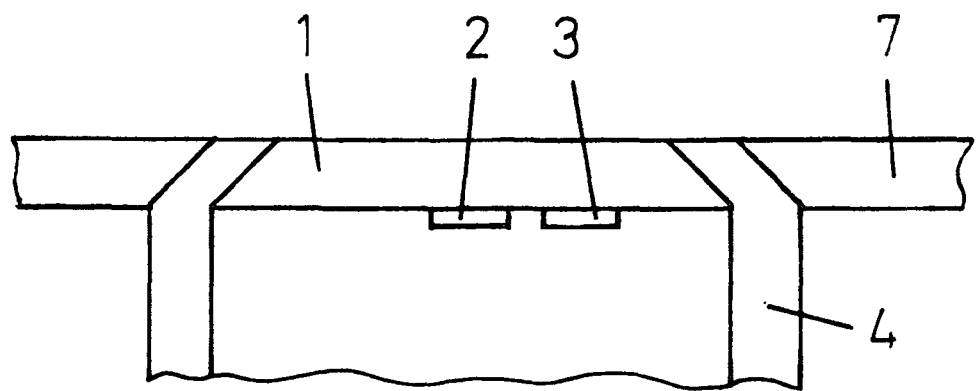
FIG. 4 shows a pressure sensor having a membrane on the front.

FIG. 4 shows a pressure sensor having a membrane 1 on the front in a basic illustration.

In one embodiment, the membrane 1 can be a wall or a part of a wall of a housing 4. The housing 4 has a cavity covered with the membrane 1 as a wall. The sensor chips 2, 3 are located on the surface of the membrane 1 pointing into the cavity. To this end, the membrane 1 can be conical or can be located in a frustoconical ring.

The invention claimed is:

1. A pressure sensor having a circular membrane having sensor chips arranged on a same radius of the circular membrane having measuring bridges having sensor elements, wherein a working medium can be applied to the circular membrane and wherein at least two sensor chips, which are spaced apart from one another and rotated relative to one another on the same radius, are located at least on a planar surface of the circular membrane that bends on application of pressure, as a result of which mechanical stresses which arise when the pressure sensor is screwed in are compensated, in that the changes in the bridge stress from the bending load in the two sensor chips are almost the same, but have opposite signs in terms of amplitude and, as a result, cancel one another out.

2. The pressure sensor according to claim 1, characterized in that the measuring bridges of the sensor chips are connected in parallel to one another in such a manner that at least one force resulting from the fastening of the membrane and thus acting on the membrane and at least one mechanical stress resulting therefrom can be compensated.

3. The pressure sensor according to claim 1, characterized in that the sensor elements of the measuring bridges are monolithic silicon bridge arrangements.

4. The pressure sensor according to claim 1, characterized in that the sensor chips are arranged off-center on the membrane.

5. The pressure sensor according to claim 1, characterized in that the membrane is arranged in such a manner that a working medium can be applied to said membrane on one side or both sides.

6. The pressure sensor according to claim 1, characterized in that said planar surface faces away from the working medium.

7. The pressure sensor according to claim 1, characterized in that the sensor chips are arranged on the membrane in such a manner that same mechanical stresses emanating from the working medium are applied to the sensor chips.

8. The pressure sensor according to claim 1, characterized in that the membrane is arranged in a housing, the housing has a cavity covered with a region of the membrane, which cavity has an opening and/or a channel configured to allow a working medium to pass through, wherein the cavity is located on a side of the membrane opposite the planar surface having the sensor chips.

* * * * *